(12) United States Patent
Liu et al.

(10) Patent No.: US 11,940,913 B2
(45) Date of Patent: Mar. 26, 2024

(54) OVERFLOW SIGNAL CACHING AND AGGREGATION

(71) Applicant: Microsoft Technology Licensing, LLC, Redmond, WA (US)

(72) Inventors: Bo Liu, Sammamish, WA (US); Ke Wang, Redmond, WA (US); Ahmed Mohamed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 17/710,206

(22) Filed: Mar. 31, 2022

(65) Prior Publication Data
US 2023/0315628 A1 Oct. 5, 2023

(51) Int. Cl.
*G06F 12/0802* (2016.01)
(52) U.S. Cl.
CPC ...... *G06F 12/0802* (2013.01); *G06F 2212/60* (2013.01)
(58) Field of Classification Search
CPC ............ G06F 12/0802; G06F 2212/60
See application file for complete search history.

(56) References Cited

U.S. PATENT DOCUMENTS

| | | |
|---|---|---|
| 7,856,530 B1 | 12/2010 | Mu |
| 2012/0124294 A1 | 5/2012 | Atkisson et al. |
| 2019/0102308 A1 | 4/2019 | Jia et al. |
| 2020/0327150 A1* | 10/2020 | Kunjur ............. G06F 16/3334 |
| 2021/0056016 A1* | 2/2021 | Bulusu ............. G06F 9/45533 |
| 2021/0279174 A1 | 9/2021 | Peterson et al. |

OTHER PUBLICATIONS

Cao, et al., "LogStore: A Cloud-Native and Multi-Tenant Log Database", In Proceedings of the International Conference on Management of Data, Jun. 20, 2021, pp. 2464-2476.
"International Search Report and Written Opinion Issued in PCT Application No. PCT/US23/010851", dated May 4, 2023, 13 Pages.

* cited by examiner

*Primary Examiner* — Gurtej Bansal

(57) ABSTRACT

A method for signal request caching is described. Signal requests are received at a signal processor from a plurality of computing devices. The received signal requests are routed to a signal data store. An ingestion rate of the received signal requests is monitored by the signal processor. When the ingestion rate meets a signal request rate threshold of the signal data store, overflow signal requests of the received signal requests are automatically routed to an intermediate cache instead of the signal data store. The overflow signal requests within the intermediate cache are aggregated into one or more signal packages, each of the one or more signal packages containing a plurality of overflow signal requests. The one or more signal packages are stored at the signal data store.

20 Claims, 8 Drawing Sheets

OVERFLOW SIGNAL CACHING AND AGGREGATION

BACKGROUND

Enterprise organizations may manage large amounts of data for entities associated with the organization, such as various users (e.g., employees), emails sent by the users, documents generated by the users, meetings attended by the users, etc. These entities may have relationships among themselves, for example, a first user (e.g., a first entity) may have an authorship relationship with a document that they generated (e.g., a second entity). Further relationships may be created or modified when the document is shared with a second user of the organization, included in an email message, or referenced within a meeting invite. Knowledge of these relationships may be leveraged to recommend relevant entities to a user when performing some tasks, such as sending an email (e.g., recommendations for documents to be attached) or composing a meeting invite (e.g., recommendations for users to invite). Moreover, the relationships may provide insights into how applications or documents are used, by whom, etc.

To manage the knowledge of these relationships, signal requests (or simply "signals") may be generated that represent the interactions (e.g., who has created, accessed, copied, modified, and/or saved a document). Different types of signal requests may be generated according to an action, such as a document creation signal request, a document open signal request, a meeting request signal request, etc. The signals may be transmitted to a signal data store (e.g., disk drive or other memory), but some scenarios may result in a higher volume of signals than can be efficiently processed and stored by the signal data store. For example, sharing a document such as a year-end report among all employees of a large organization may result in a large number of share signals (when the document is first shared) and open signals (when users open the document). In these scenarios, the signal data store may fail to timely process some of the signals, resulting in those signals being re-sent or lost.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to signal caching.

In one aspect, a method for signal request caching is provided. The method includes: receiving signal requests at a signal processor from a plurality of computing devices; routing the received signal requests to a signal data store; monitoring an ingestion rate of the received signal requests by the signal processor; when the ingestion rate meets a signal request rate threshold of the signal data store, automatically routing overflow signal requests of the received signal requests to an intermediate cache instead of the signal data store; aggregating the overflow signal requests within the intermediate cache into one or more signal packages, each of the one or more signal packages containing a plurality of overflow signal requests; and storing the one or more signal packages at the signal data store.

In another aspect, a system for processing signal requests that represent user interactions is provided. The system includes a plurality of shards configured to store received signal requests. The system also includes a signal processor configured to process the received signal requests, identify a shard of the plurality of shards, and store the received signal requests in the identified shard. The system further includes an intermediate cache configured to temporarily store at least some of the received signal requests when an ingestion rate of the received signal requests meets a signal request rate threshold of the identified shard. The signal processor is configured to aggregate individual signal requests stored within the intermediate cache into a signal package before storing the signal package in the identified shard.

In yet another aspect, a system for processing signal requests that represent user interactions is provided. The system includes a signal processor configured to process received signal requests. The signal processor is configured to: receive signal requests from a plurality of computing devices; route the received signal requests to a signal data store; monitor an ingestion rate of the received signal requests by the signal processor; when the ingestion rate meets a signal request rate threshold of the signal data store, automatically route overflow signal requests of the received signal requests to an intermediate cache instead of the signal data store; aggregate the overflow signal requests within the intermediate cache into one or more signal packages, each of the one or more signal packages containing a plurality of overflow signal requests; and store the one or more signal packages at the signal data store.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
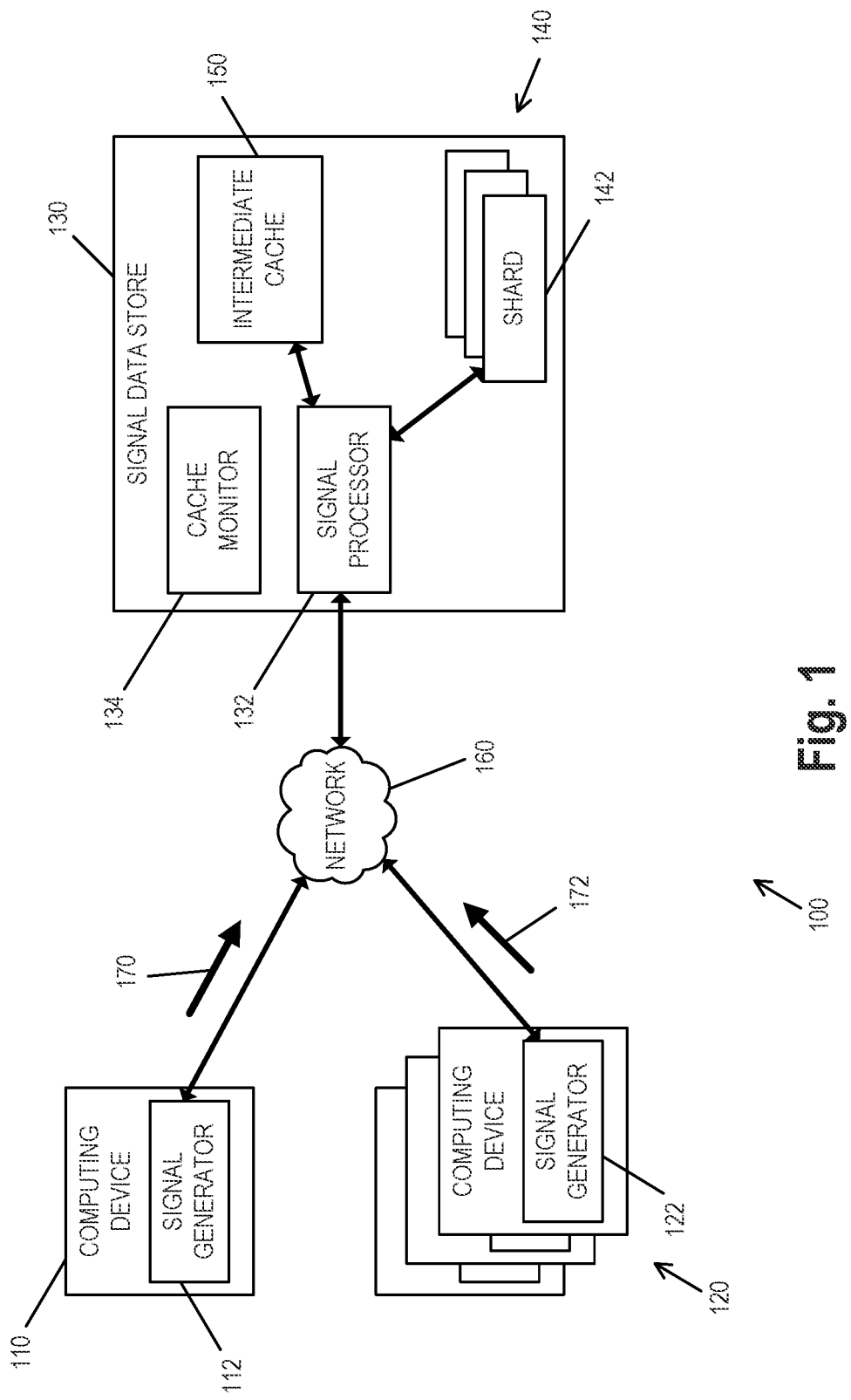
FIG. 1 shows a block diagram of an example of a signal processing system, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Metadata about application and/or document interactions among users in a large organization may be captured by generating signal requests that represent the interactions, but efficient processing of the signal requests may be challenging. Generally, the applications may be used to interact with documents, files, emails, instant messages or chats, streaming audio or video, contacts, calendars or calendar items (e.g., meeting requests, reminders, appointments), or other suitable data. Signal requests may be generated to indicate which users have created, accessed, copied, modified, and/or saved a document, for example, or to indicate how software applications are used, which features, patterns of use, etc.

In some scenarios, signal requests associated with a particular user may be stored in a single portion or "shard" of a signal data store (user shard). In many scenarios, signal generators provide signal requests to shards within a signal data store without a substantial delay. However, when a large number of signal requests arrive, they may place extra load on both the shard and some of the signal generators (e.g., due to retrying signal requests that have been throttled or dropped). For a large organization, when a chief executive officer (CEO) of a company shares a document with all the employees of the company, the document may be accessed frequently within a short period of time, which may generate a large number of signal requests to be saved into the shard of the document owner (e.g., the CEO), overloading the shard. In other scenarios, discussions of popular/breaking topics through instant messages in groups using software clients, such as Microsoft Teams, may generate hundreds of thousands of instant messages from different users. A burst of interactions among the group may represent hundreds of thousands of signal requests to be captured in a group shard, which may overload the shard.

To reduce the likelihood of overloading a shard, examples of a signal processing system described herein include an intermediate cache. The intermediate cache is configured to receive the signal requests when an ingestion rate of signal requests exceeds a signal request rate threshold of the shard (e.g., incoming signal request rate runs above 100 signal requests per second for four seconds). When the signal request rate threshold is exceeded, a signal processor routes at least some signal requests (e.g., overflow signal requests) to the intermediate cache instead of the shard. The intermediate cache is configured to have higher input/output efficiency than the shard and thus may more readily store a high number or rate of signal requests. The signal processor aggregates the signal requests within the intermediate cache into one or more data structures (e.g., 1000 signal requests per data structure) before flushing the data structures to the shard. By flushing the data structure instead of the individual signal requests, much of the input/output transaction costs (e.g., packet headers and processing overhead) is avoided so that overall throughput is improved.

This and many further embodiments for a computing device are described herein. For instance, FIG. 1 shows a block diagram of an example of a signal processing system 100, according to an example embodiment. The signal processing system 100 includes a signal data store 130 and one or more computing devices, such as computing device 110 and computing devices 120. A network 160 communicatively couples computing device 110, the computing devices 120, and the signal data store 130. The network 160 may comprise one or more networks such as local area networks (LANs), wide area networks (WANs), enterprise networks, the Internet, etc., and may include one or more of wired, wireless, and/or optical portions.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). Computing device 110 may be configured to execute one or more software applications (or "applications") and/or services and/or manage hardware resources (e.g., processors, memory, etc.), which may be utilized by users of the computing device 110. The computing device 120 may include one or more server devices, distributed computing platforms, cloud platform devices, and/or other computing devices. Users of the computing device 110 may utilize the computing device 110 to access documents, send and receive email messages or meeting requests, send and receive instant messages or chat messages, open documents or other files, and other suitable tasks. Generally, the computing devices 120 are similar to the computing device 110 and may be implemented as mobile computers, tablet computers, etc.

The computing device 110 includes a signal generator 112 configured to generate and send signal requests to the signal data store 130. As described above, signal requests generally capture data about how applications and/or documents are used (or not used). In other words, the signal requests are metadata of user interaction with applications and/or documents and may identify users that have created, accessed, copied, modified, and/or saved a document. The signal generator 112 may be implemented as a module within a software application (e.g., a module within a word processor for a text document), an operating system component (e.g., a file explorer application or resource monitor), a network processor that examines network packets, or other suitable processors or modules.

In some examples, a signal request is represented as a plain text file or data portion, for example, using XML or another suitable language. An example signal request may include various fields for metadata, such as a SignalType that indicates a type of action that was taken by a user (e.g., open file, copy file, call a second user, view a message), a StartTime that indicates when the action was started, an EndTime that indicates when the action was stopped (e.g., how long did a file take to open, a duration of a phone call, a duration of time spent reading an email), a CreationTime that indicates when the signal request was created, an ItemID that provides a link to content related to the signal request (e.g., a link to a file that was opened, or a message that was viewed), further details about an application used for the action, an actor (e.g., the user) that initiated the action, or a device the actor used for the action (e.g., the computing device 110), or other suitable information.

In the example shown in FIG. 1, the signal generator 112 sends a signal request 170 to the signal data store 130. In some examples, the signal generator 112 is configured to "fire and forget" the signal request 170. In other words, the signal generator 112 does not wait for a confirmation of receipt by the signal data store 130. In other examples, the signal generator 112 waits for a confirmation receipt from the signal data store 130 and may re-send the signal request 170 (or send a new signal request, not shown) if the confirmation receipt is not received.

In some examples, the signal request 170 is different from a document request (e.g., a request for content). For example, a user of the computing device 110 may request a text document to be opened by interacting with a file explorer window (e.g., double-clicking an icon associated with the text document) or using an "open document" dialog box and the computing device 110 may send an open document request to a document store (content data store, cloud storage service, etc., not shown) that stores the text document. The signal generator 112 may also generate and send an open signal request (e.g., the signal request 170) to the signal data store 130. In this example, the open signal request is different from the open document request and the requests are sent to different receivers (i.e., the document store and the signal data store 130).

The signal data store 130 is configured to receive and process signal requests from the computing device 110 and/or the computing devices 120. In the example shown in FIG. 1, the signal data store 130 comprises a signal processor 132, a cache monitor 134, a plurality of shards 140, and an intermediate cache 150. The signal processor 132 is configured to process the signal requests, then store them in an appropriate shard of the plurality of shards 140. The signal processor 132 may be a dedicated processor, a service application, or other suitable module or processor, in various examples. In some examples, the signal processor 132 routes or forwards signal requests (e.g., overflow signal requests) to the intermediate cache 150 before processing the signal requests. In some examples, the signal processor 132 aggregates the signal requests within the intermediate cache 150 into a signal package, which is then stored within the appropriate shard (e.g., shard 142). In other examples, multiple instances of the signal processor 132 are utilized, for example, a first signal processor performs a routing decision (e.g., whether to process a signal request or route the signal request to the intermediate cache 150) while a second signal processor (not shown) generates and stores the signal package in the appropriate shard. In this example, the second signal processor may be between the intermediate cache 150 and the plurality of shards 140.

In some examples, the signal processor 132, the signal generator 112, and the signal generator 122 are part of a substrate signal service that manages signal requests for an enterprise network configuration (e.g., with computing devices 110 and 120 and signal data store 130 as members). The cache monitor 134 is configured to monitor signal requests stored within the intermediate cache 150, for example, to determine how many signal requests are stored, an age of the signal requests, priority level of the signal requests, or other suitable information. The cache monitor 134 may be configured to trigger a flush of the intermediate cache 150 when one or more flush criteria are met.

The plurality of shards 140 represent a portion of a data or file storage system. In some examples, shards within the plurality of shards 140 are implemented as a database, cluster, storage drives (e.g., solid state disks or hard disk drives), or other suitable memory. The plurality of shards 140 may be distributed across multiple instances of the signal data store 130. In some examples, an instance of the signal data store 130 is designated for use with a particular set of users, such as users that work for a same company, users that live in a geographic area (e.g., Europe or North America), users whose data is subject to a same data storage regulation (e.g., GDPR).

Individual shards, such as the shard 142, may correspond to a particular computing device or user of the computing device. In the example shown in FIG. 1, the shard 142 corresponds to a user (not shown) of the computing device 110. In some examples, the plurality of shards 140 includes one shard for each user or group of users (e.g., for a chat group, user group, department of an organization, etc.).

When one user shares a file that many other users then access within a short period of time, a large number of signal requests may be directed to the shard of the sharing user. As an example, a user (CEO) of the computing device 110 may share a file with all employees of a company, who may then open the file using the computing devices 120. In this example, the signal generator 112 may generate the signal request 170 as a share file signal request, which is stored in the shard 142 associated with the CEO. As users of the computing devices 120 open the shared file, the corresponding signal generators 122 may generate respective instances of the signal request 172 as an open file signal request. When a large number of signal requests 172 are generated, they may overload the signal processor 132. In some examples, the signal processor 132 has reduced performance when overloaded (e.g., slower response time). In other examples, the signal processor 132 drops signal requests that exceed a maximum processing capability of the signal processor 132.

The intermediate cache 150 is configured to temporarily store signal requests (e.g., signal requests 172) when an ingestion rate of signal requests meets a signal request rate threshold. The intermediate cache 150 comprises a random-access memory (RAM), solid state drive (SSD), or other suitable data storage device. Generally, the intermediate cache 150 is faster than the shards of the plurality of shards 140, for example, the intermediate cache 150 may have a higher input/output rate for storing/retrieving signal requests.

Figure 2:
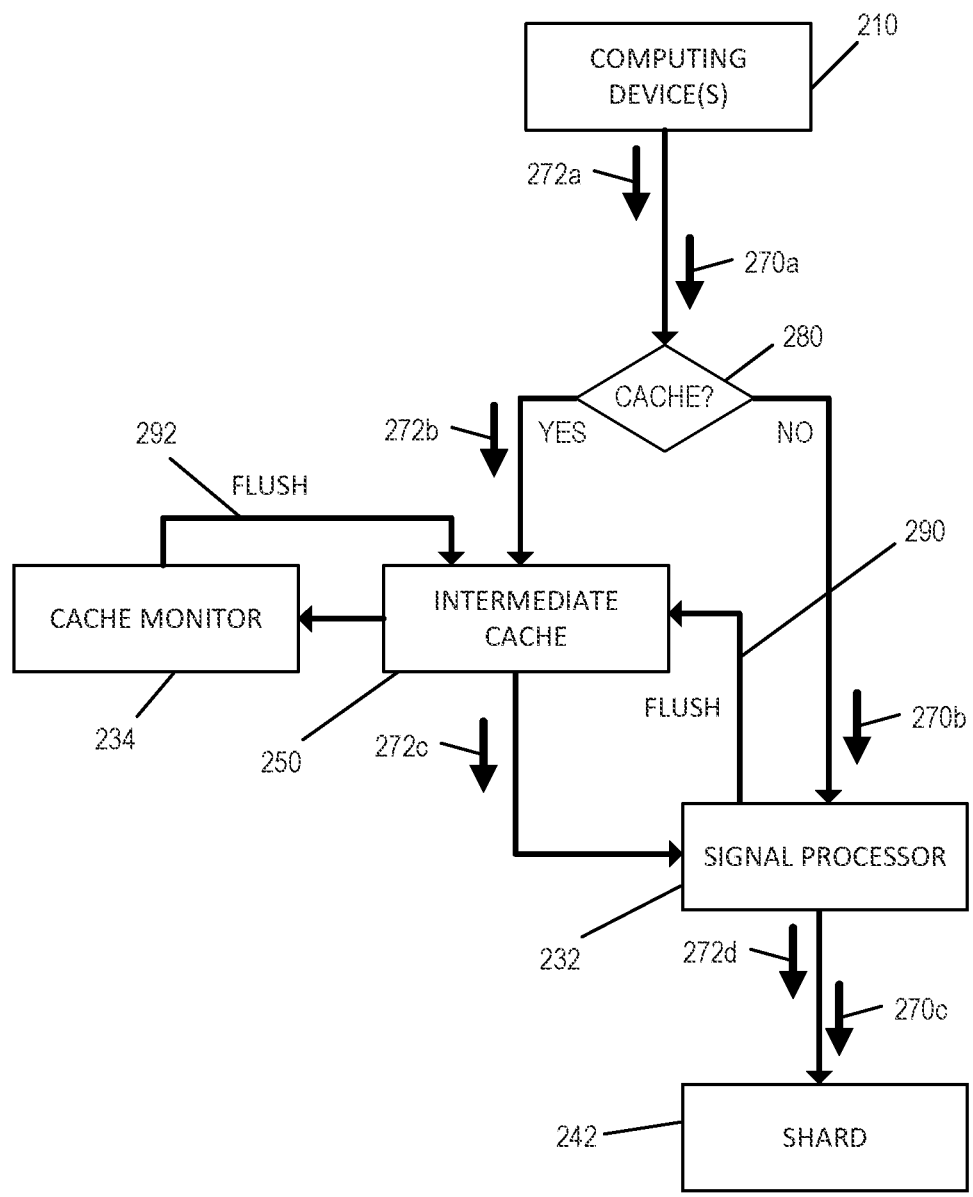
FIG. 2 shows a block diagram of an example of a message flow for signal request processing, according to an example embodiment.

FIG. 2 shows a block diagram of an example of a message flow 200 for signal processing, according to an example embodiment. The message flow 200 begins with one or more computing devices 210, which may generally correspond to the computing device 110 or computing devices 120. The computing device 210 generates a signal request 270 (e.g., similar to signal request 170). At decision 280, it is determined whether the signal request 270 (shown as signal request 270a) should be processed by a signal processor 232 (similar to the signal processor 132) or should be routed to an intermediate cache 250 (similar to the intermediate cache 150). In some examples, the decision 280 is performed by the signal processor 232. In other examples, the decision 280 is performed by the cache monitor 234 or another suitable device.

The decision 280 may be determined based on whether an ingestion rate of signal requests meets a signal request rate threshold. In various examples, the ingestion rate may correspond to an ingestion rate of the signal processor 232, an ingestion rate of the shard 242 (similar to the shard 142) in which the signal request 270a is to be stored, or both ingestion rates of the signal processor 232 and the shard 242. Generally, the ingestion rate is a rate at which signal requests are received at the corresponding device (e.g., at the signal processor 232, and/or at the shard 242). In some examples, the ingestion rate is a rate at which signal requests are processed (or to be processed) by the signal processor 232 or a rate at which signal requests are to be stored by the shard 242. In some examples, the signal processor 232 and/or the shard 242 receive signal requests from multiple sources (e.g., multiple instances of the signal generator 112 and/or 122) and the ingestion rate corresponds to an aggregate ingestion rate from the multiple sources.

Example signal request rate thresholds for the ingestion rate may be when an incoming signal request rate runs above 100 signal requests per second, 250 signal requests per second, or another suitable value. In some examples, the signal request rate threshold is met when the incoming signal request rate maintains a configurable signal request rate (e.g., 100 signal requests per second) for a configurable period of time (e.g., four seconds, ten seconds, or another suitable value). In some examples, a plurality of signal request rates and periods of time are configured using a tiered approach, for example, 175 signal requests per second for 10 seconds, 275 signal requests per second for 5 seconds, and 575 signal requests per second for 2 seconds. In some examples, signal request rate thresholds (e.g., receive rates and/or periods of time) are set to values based on a size of an internal cache (not shown) of the shard 242, a size of the signal requests, and a storage rate of the shard 242. In other words, the signal request rate thresholds correspond to values that prevent the internal cache of the shard 242 from overflowing and dropping signal requests before they can be stored in the shard 242.

Generally, the signal request rate threshold is met when the ingestion rate meets or exceeds a value of the signal request rate threshold. As one example, when the signal request rate threshold is 225 signal requests per second, the signal request rate threshold is met when the ingestion rate is 225 signal requests per second, 275 signal requests per second, 425 signal requests per second, etc. As another example, when the signal request rate threshold is 225 signal requests per second for a period of time of 4 seconds, the signal request rate threshold is met once a rate of receipt of signal requests is maintained at or above 225 signal requests per second for 4 seconds and while the rate of receipt stays at or above 225 signal requests per second (e.g., the signal request rate threshold is met until the rate of receipt drops below 225 requests per second). When the signal request rate threshold is met or exceeded, the signal processor 232 may route at least some signal requests to the intermediate cache 250 instead of to the shard 242. In the example shown in FIG. 2, the signal request rate threshold has not been met for the signal request 270 and the signal request 270 is processed by the signal processor 232 (as signal request 270b) and stored within a suitable shard 242 (as signal request 270c).

The message flow 200 also includes a signal request 272 which is generated by the computing devices 210 (shown as signal request 272a). In the example shown in FIG. 2, the signal request rate threshold has been met at decision 280 for the signal request 272 and the signal request 272 is routed to the intermediate cache 250 (as signal request 272b). Signal requests stored within the intermediate cache 250 may be flushed to the signal processor 232 (as signal request 272c) based on a firing of one or more flush triggers. The flush triggers generally identify one or more conditions to be met, upon which the signal requests are flushed and provided to the signal processor 232, then to the corresponding shard 242 (as signal request 272d). In some examples, the flush trigger is a threshold size, such as when a number of signal requests within the intermediate cache 250 reaches a configurable storage threshold (e.g., 200 signal requests in total, 100 signal requests for a particular shard, 2 Megabytes of signal requests, etc.). In other examples, the flush trigger corresponds to a period of time during which signal requests have been stored in the intermediate cache 250. In these examples, the flush trigger may fire when an oldest signal request within the intermediate cache 250 has been stored for ten seconds, ten minutes, or another suitable value. In still other examples, the flush trigger may fire when the intermediate cache 250 has reached a configurable storage level, such as 75% full, 85% full, or another suitable value.

In other examples, the flush trigger is fired when a flush signal request is received, e.g., from the cache monitor 234 and/or the signal processor 232. The flush signal request may be a specific message or signal request associated with the intermediate cache 250. In some examples, the flush signal request is a signal request having a particular SignalType (e.g., "flush"). In some examples, the cache monitor 234 sends a flush signal request to the intermediate cache 250 and/or to the signal processor 232, for example, on a flush interval of five seconds, ten seconds, or another suitable value. In some examples, a response header is transmitted to a signal generator (e.g., signal generator 112 or 122) to identify a time at which the corresponding computing device should send the flush signal request to the intermediate cache 250. In other examples, the cache monitor 234 automatically generates the flush signal request based on the flush triggers. For examples, the cache monitor 234 may monitor latency metrics of the signal requests within the intermediate cache 250 and send the flush signal request when a latency metric is approaching a threshold value.

The signal processor 232 may be configured to aggregate signal requests and generate a signal package before the signal requests are stored within the shard 242. Generally, the signal processor 232 generates a signal package that includes multiple signal requests that have been stored in the intermediate cache 250 and provides the signal package to the shard 242. In some examples, the signal package includes multiple signal requests, but only one corresponding packet header instead of one packet header for each of the multiple signal requests, which may reduce storage volume and or processing at the shard 242.

In some embodiments, signal requests within the intermediate cache 250 are aggregated as new signal requests are added to the intermediate cache 250 until a flush trigger is fired. For example, signal requests to be stored within the shard 242 may be stored in adjacent locations within the intermediate cache 250 as they arrive at the intermediate cache 250 to create a signal package, which may then be transferred to the shard 242 when a flush is triggered. In other examples, the signal processor 232 generates a signal package as signal requests are flushed from the intermediate cache 250. For example, the signal processor 232 may store signal requests (e.g., sequentially) within the intermediate cache 250 as the signal requests arrive, but then aggregate signals into signal packages when a flush is triggered.

Signal packages may be aggregated based on one or more fields, such as a SignalType, CreationTime, and/or ItemID of the signal requests. In one example, signal requests having a same SignalType and ItemID may be aggregated into a signal package. In another example, signal requests having a same SignalType and having a CreationTime within a same time window (e.g., within a window of ten seconds) may be aggregated into a signal package. In some examples, the signal packages are aggregated based on user identifiers of the signal requests. For example, signal requests having a same object identifier (OID), passport unique identifier (PUID), and/or consumer ID (CID) are aggregated together. In these examples, aggregation by user identifier allows for proper data retention and compliance with data storage regulations (e.g., GDPR). In some examples, signal requests within a signal package are stored with only one copy of a field for signal request fields that are the same among the signal requests within the signal package. For example, signal requests having a same SignalType within a signal package may be stored with only one instance of the SignalType for the signal package, instead of having one instance of the SignalType for each signal request within the signal package, which may reduce storage volume and or processing at the shard 242.

Figure 3:
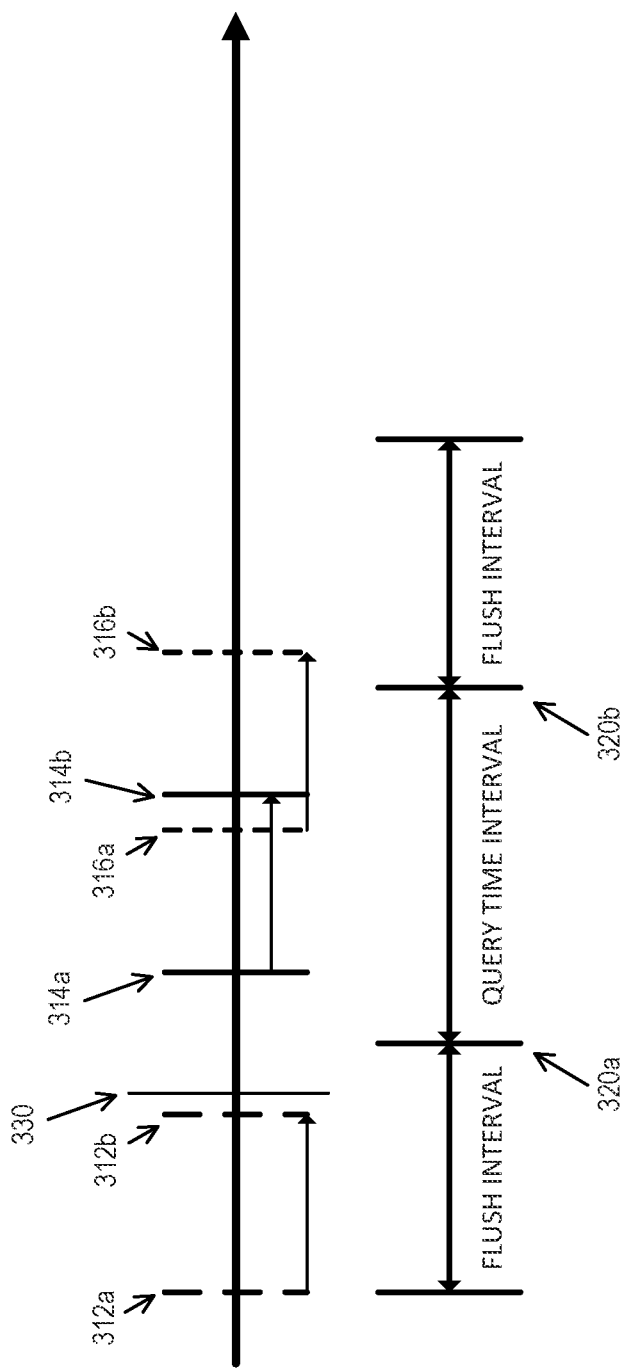
FIG. 3 shows a diagram of an example signal timing for segregation of a signal package, according to an example embodiment.

FIG. 3 shows a diagram of an example signal request timing 300 for segregation of a signal package, according to an example embodiment. When signal requests have been aggregated into a signal package and stored within the plurality of shards 140, the signal processor 132 is configured to segregate the signal requests in response to a query for signal requests matching a search query. This allows consumers of the signal requests stored in the plurality of shards 140 to access signal requests using familiar calls to a signal application programming language (API), whether or not the signal requests are stored individually or as part of a signal package.

Generally, search queries for signal requests may be directed to finding a first set of signal requests that match given criteria, then finding a second set of signal requests that match the given criteria, where the second set is ranked behind the first set. As one example, a search query for signal requests having a SignalType of "open document" may correspond to a result set having 275 results, where a first set of signal requests from the result set may be specified as a top 20 signal requests (i.e., results 1 to 20), and the second set of signal requests from the result set may be specified as a top 20 signal requests with an offset or "skip" of 20 (i.e., results 21 to 40). Other criteria for a search query may include a StartTime, EndTime, ItemID, or other suitable fields from a signal request.

In some examples, a signal package contains individual signal requests with same values for a SignalType, CreationTime, and ItemID, while a StartTime and EndTime may be different for the individual signal requests. For those fields (SignalType, CreationTime, ItemID) that are the same within a signal package, no changes are needed for the signal processor 132 to identify results matching a given criteria. However, a search query using the StartTime and/or EndTime may need further processing to identify suitable results.

In the example shown in FIG. 3, the signal timing 300 includes a first signal request 312 having a StartTime of 312*a* and EndTime of 312*b*, a second signal request 314 having a StartTime of 314*a* and EndTime of 314*b*, and a third signal request 316 having a StartTime of 316*a* and EndTime of 316*b*. Since the signal requests 312, 314, and 316 have varying StartTimes and EndTimes, they may be stored in different signal packages, for example, due to a flush of the intermediate cache 150 (e.g., the first signal request 312 may be in a first signal package corresponding to a flush at a time 330, while the signal requests 314 and 316 may be in a second signal package). For a search query 320 having a time window with minimum StartTime at 320*a* and a maximum EndTime at 320*b*, the signal processor 132 is configured to extend the time window by a duration corresponding to a flush interval for the intermediate cache 150. In this way, individual signal requests within adjacent signal packages may be searched and identified.

Figure 4:
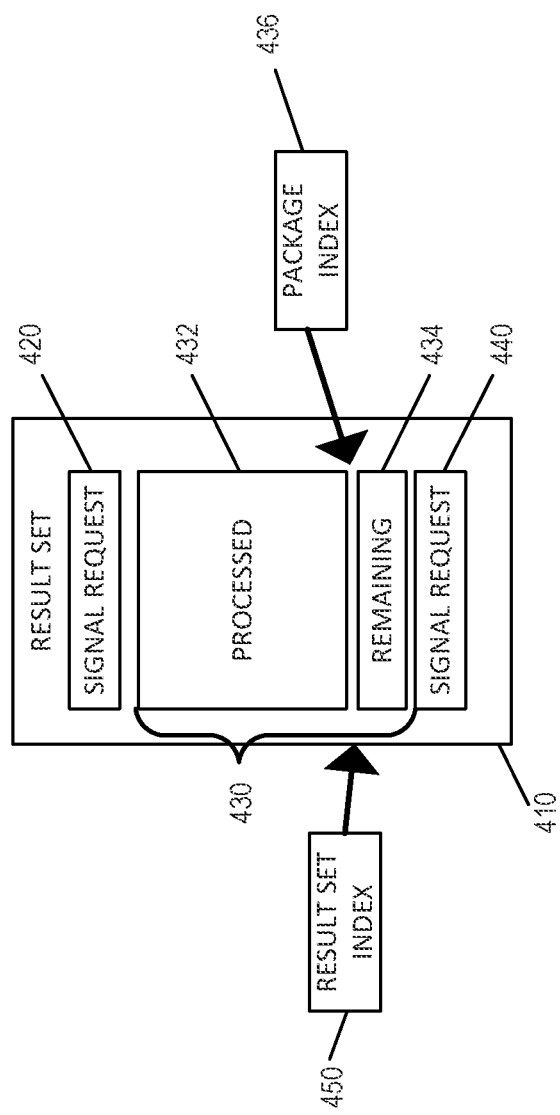
FIG. 4 shows a diagram of an example logic flow for signal request processing, according to an example embodiment.

FIG. 4 shows a diagram of an example logic flow 400 for signal processing, according to an example embodiment. More specifically, the logic flow 400 describes processing of signal requests by segregating signal requests within a signal package. As described above, a search query for signal requests may correspond to 275 results, but returning all 275 results all at once may be inefficient. In some scenarios, a search query includes a $top variable corresponding to a result set size (e.g., $top=20 returns 20 results) and a $skip variable corresponding to a starting point for the result set (e.g., $skip=50 starts the result set at the $51^{st}$ result). To return a result set specified by $top and $skip, the signal processor 132 may be configured to maintain a package index and a result set index. For example, the package index provides an indication of a current signal request within a signal package for subsequent iterations of a search (e.g., increasing the $skip of a search query), while the result set index provides an indication of a current signal request within the result set.

In the example shown in FIG. 4, the signal processor 132 handles a search query that corresponds to a result set 410 retrieved from a shard 412 (e.g., from one of the plurality of shards 140). The result set 410 includes an individual signal request 420, a signal package 430 (having five signal requests), and another individual signal requests 440, for a total result count of seven. When the search query includes a $top value of 5 and a $skip value of 0, the signal processor 132 may return the first five results from the result set 410, however, the first five values includes the individual signal request 420 and a first four signal requests of the signal package 430. The signal processor 132 maintains a result set index 450 set to a value of 5 to keep track of a location of a current signal request within the result set 410. The signal processor 132 also maintains a package index 436 set to a value of 4 to keep track of a location of a current signal request within the signal package 430.

Figure 5:
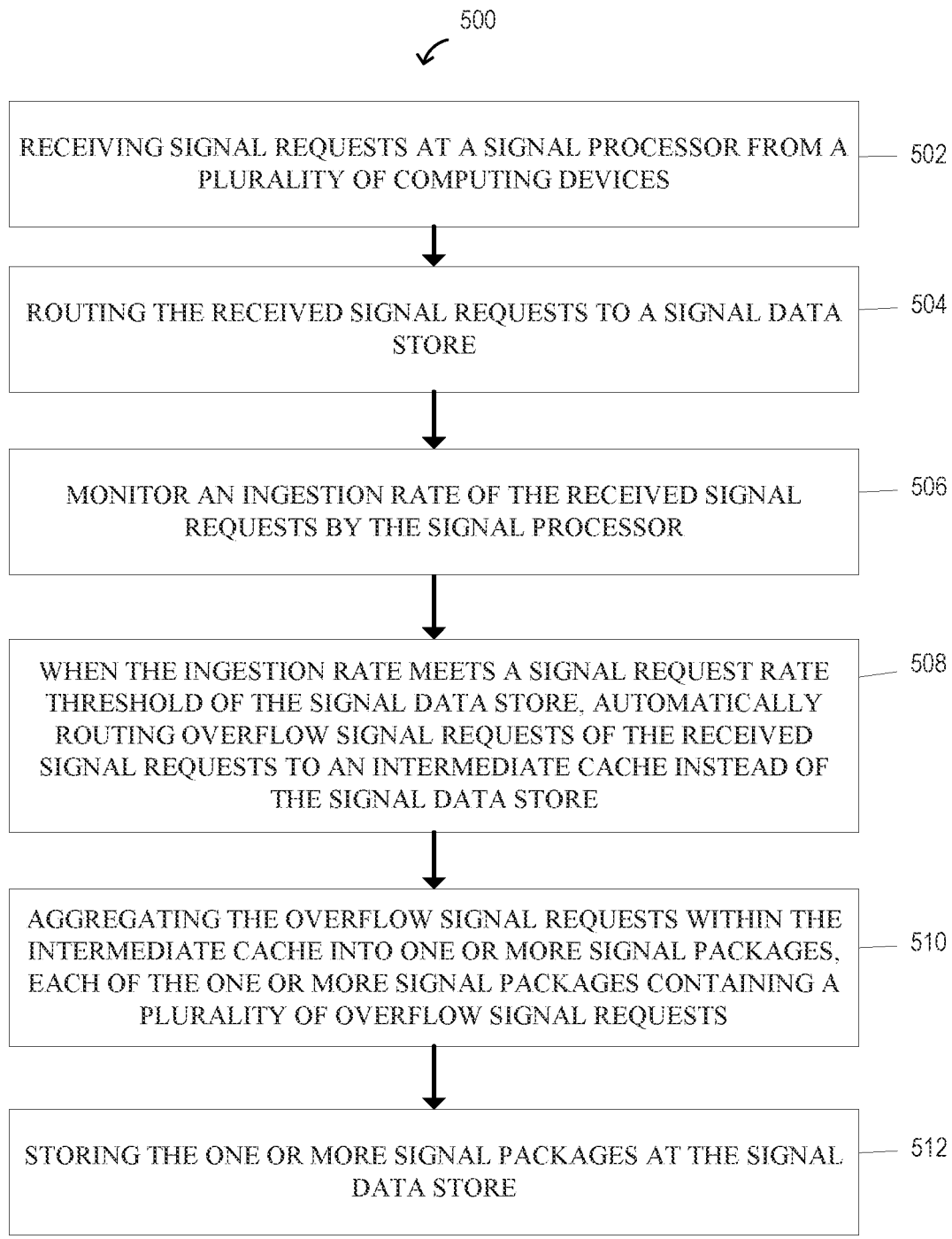
FIG. 5 shows a flowchart of an example method for signal caching, according to an example embodiment.

FIG. 5 shows a flowchart of an example method 500 for signal caching, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the signal generator 112), the computing device 120 (e.g., via the signal generator 122), the signal data store 130 (e.g., via the signal processor 132, the cache monitor 134, and/or the intermediate cache 150), or other suitable computing device.

Method 500 begins with step 502. At step 502, signal requests are received at a signal processor from a plurality of computing devices. In some examples, the signal requests correspond to the signal requests 170 and/or 172 from the computing devices 110 and 120.

At step 504, the signal requests are routed to a signal data store, for example, to the plurality of shards 140 of the signal data store 130.

At step 506, an ingestion rate of the received signal requests is monitored by the signal processor.

At step 508, when the ingestion rate meets a signal request rate threshold of the signal data store, overflow signal requests of the received signal requests are automatically routed to an intermediate cache instead of the signal data store. In some examples, the intermediate cache and the signal data store correspond to the intermediate cache 150 and the signal data store 130, respectively.

At step 510, the overflow signal requests within the intermediate cache are aggregated into one or more signal packages, where each of the one or more signal packages containing a plurality of overflow signal requests. In some examples, the signal processor 132 aggregates the overflow signal requests. In some examples, the signal processor 132 routes the overflow signal requests to the intermediate cache 150 and another signal processor (not shown) aggregates the overflow signal requests.

At step 512, the one or more signal packages are stored at the signal data store (e.g., in an identified shard of the plurality of shards 140).

In some examples, a first signal package of the one or more signal packages comprises a first plurality of overflow signal requests and storing the one or more signal packages comprises storing the first plurality of overflow signal requests using a single write request. In some examples, the method 500 further includes aggregating overflow signal requests having a same user identifier into a same signal package.

In some examples, the overflow signal requests include all of the signal requests received while the ingestion rate meets the signal request rate threshold. In other examples, the overflow signal requests include signal requests received with an ingestion rate above the signal request rate threshold.

In some examples, the signal request rate threshold corresponds to a rate of receipt of the received signal requests and automatically routing the overflow signal requests comprises automatically routing overflow signal requests when the ingestion rate meets or exceeds the rate of receipt.

In some examples, the signal request rate threshold corresponds to a rate of receipt of the received signal requests for a preconfigured period of time and automatically routing the overflow signal requests comprises automatically routing overflow signal requests when the ingestion rate meets or exceeds the rate of receipt for the preconfigured period of time.

The method 500 may further comprise flushing the intermediate cache when a flush trigger is fired. In some examples, the flush trigger is fired when a flush signal request is received from a signal generator that generated an overflow signal request as the flush trigger. In some examples, the flush trigger is fired when a number of signal requests within the intermediate cache reaches a configurable storage threshold. In some examples, the flush trigger is fired when an oldest signal request within the intermediate cache has been stored for a configurable period of time. In some examples, flushing the intermediate cache includes deleting the one or more signal packages from the intermediate cache after storing the one or more signal packages at the signal data store.

Figure 6:
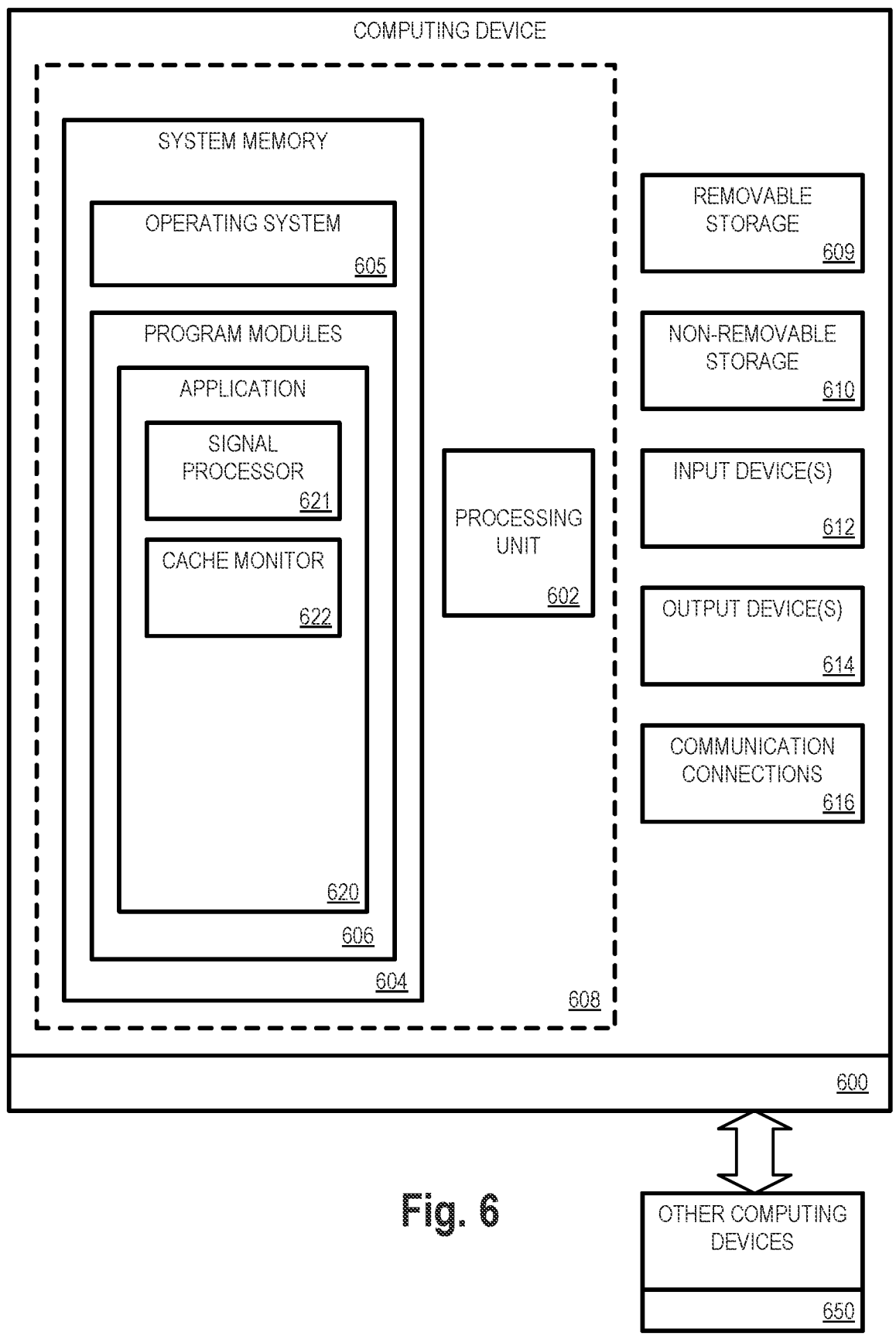
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing a signal processor application 620 on a computing device (e.g., computing device 110), including computer executable instructions for signal processor application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running signal processor application 620, such as one or more components with regard to FIG. 1, and, in particular, signal processor 621 (e.g., corresponding to signal processor 132) and cache monitor 622 (e.g., corresponding to cache monitor 134).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., signal processor application 620) may perform processes including, but not limited to, the aspects, as described herein. Other program modules that may be used in accordance with aspects of the present disclosure, and in particular for caching signal requests, may include signal processor 621 and cache monitor 622.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
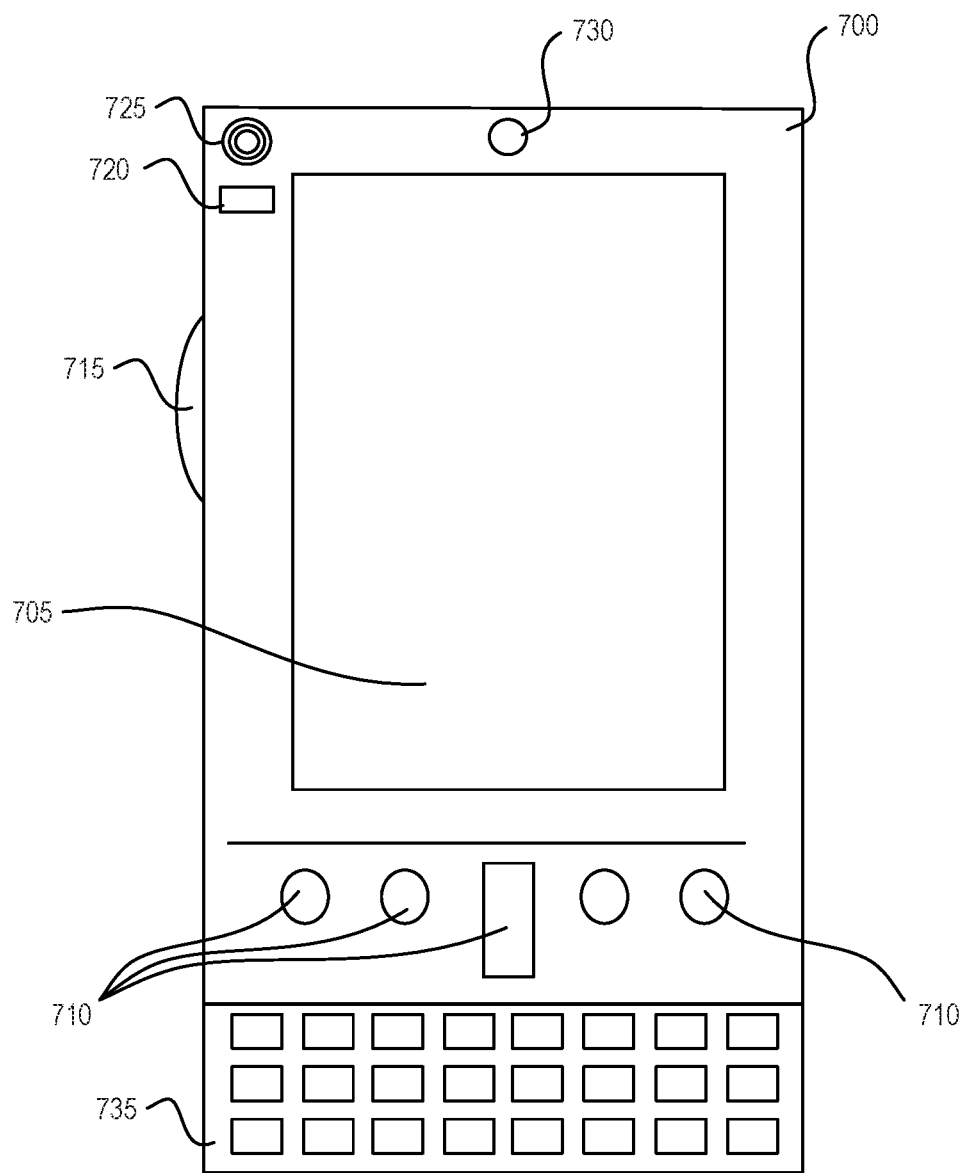
FIGS. 7 and 8 are simplified block diagrams of a mobile computing device with which aspects of the present disclosure may be practiced.
Figure 8:
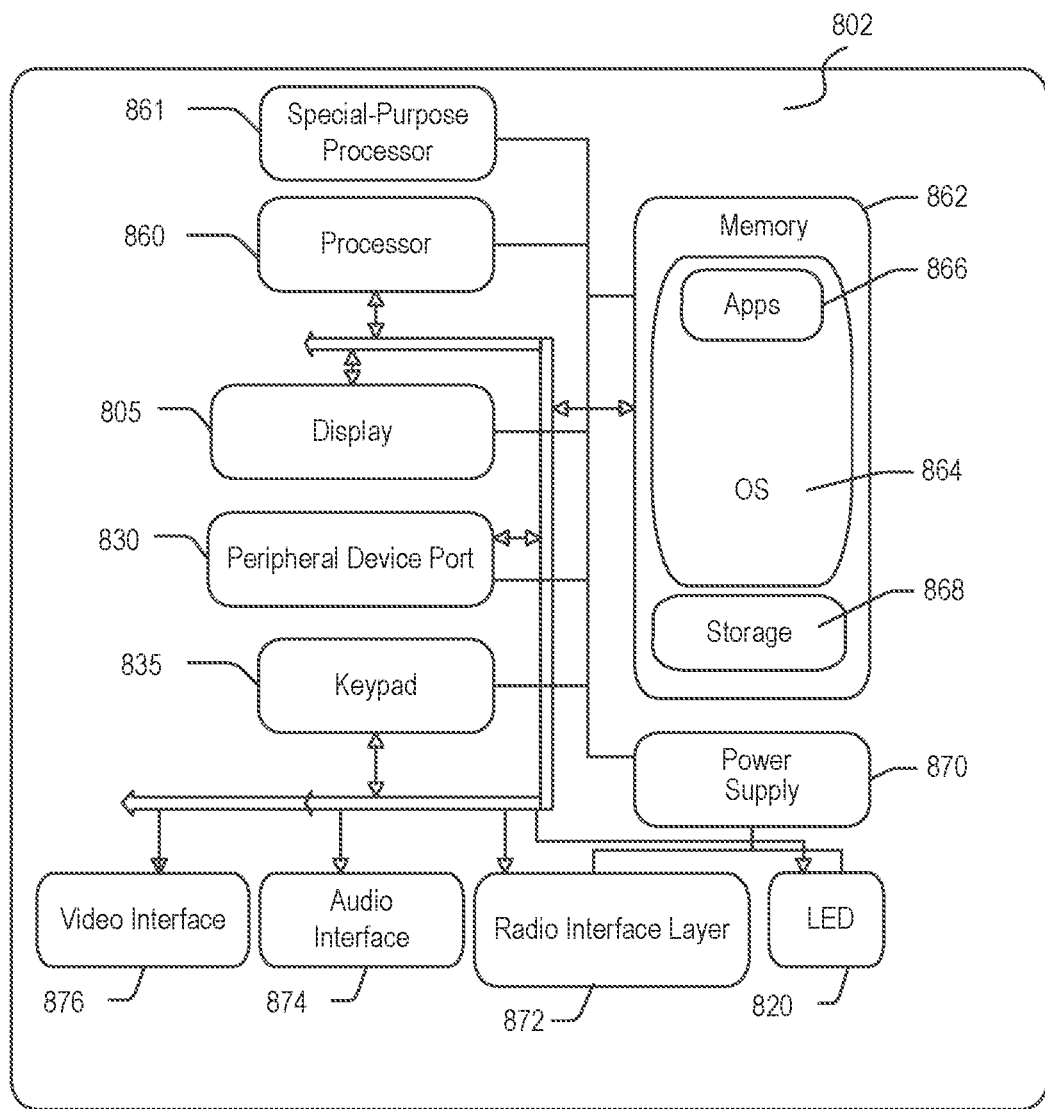

FIGS. 7 and 8 illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may include a front-facing camera 730. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signal requests to or receiving signal requests from an external device.

FIG. 8 is a block diagram illustrating the architecture of one aspect of a mobile computing device. That is, the mobile computing device 700 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone. The system 802 may include a display 805 (analogous to display 705), such as a touch-screen display or other suitable user interface. The system 802 may also include an optional keypad 835 (analogous to keypad 735) and one or more peripheral device ports 830, such as input and/or output ports for audio, video, control signals, or other suitable signals.

The system 802 may include a processor 860 coupled to memory 862, in some examples. The system 802 may also include a special-purpose processor 861, such as a neural network processor. One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725

(e.g., audio transducer 725 illustrated in FIG. 7). In the illustrated embodiment, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device port 830 (e.g., for an on-board camera) to record still images, video stream, and the like.

A mobile computing device 700 implementing the system 802 may have additional features or functionality. For example, the mobile computing device 700 may also include additional data storage devices (removable and/or nonremovable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for signal request caching, the method comprising:
   receiving signal requests at a signal processor from a plurality of computing devices, each of the signal requests having a plurality of fields, the plurality of fields having metadata about user interactions with applications;
   routing the received signal requests to be stored at a signal data store;
   monitoring an ingestion rate of the received signal requests by the signal processor;
   when the ingestion rate meets a signal request rate threshold of the signal data store, automatically routing overflow signal requests of the received signal requests to be stored at an intermediate cache instead of the signal data store;
   aggregating the overflow signal requests within the intermediate cache into one or more signal packages according to content within the plurality of fields, each of the one or more signal packages containing a plurality of overflow signal requests, wherein a first signal package of the one or more signal packages comprises a first plurality of overflow signal requests; and
   storing the one or more signal packages at the signal data store, including storing the first plurality of overflow signal requests of the first signal package using a single write request.

2. The method of claim 1, wherein storing the one or more signal packages comprises storing the one or more signal packages to respective shards of the signal data store, the signal data store comprising a plurality of shards.

3. The method of claim 1, wherein the signal request rate threshold corresponds to a rate of receipt of the received signal requests; and
   wherein automatically routing the overflow signal requests comprises automatically routing overflow signal requests when the ingestion rate meets or exceeds the rate of receipt.

4. The method of claim 1, wherein the signal request rate threshold corresponds to a rate of receipt of the received signal requests for a preconfigured period of time; and
   wherein automatically routing the overflow signal requests comprises automatically routing overflow signal requests when the ingestion rate meets or exceeds the rate of receipt for the preconfigured period of time.

5. The method of claim 1, wherein:
   aggregating the overflow signal requests within the intermediate cache into one or more signal packages according to content within the plurality of fields comprises aggregating related overflow signal requests having a same value for a same field of the plurality of fields into a related signal package; and
   storing the one or more signal packages comprises storing the related overflow signal requests with only one copy of the related field for the related overflow signal requests of the related signal package.

6. The method of claim 1, the method further comprising aggregating overflow signal requests having a same user identifier for a user field of the plurality of fields into a same signal package.

7. The method of claim 6, wherein aggregating the overflow signal requests comprises aggregating the overflow signal requests in the intermediate cache as new signal requests are received until a flush trigger is fired.

8. The method of claim 1, the method further comprising flushing the intermediate cache when a flush trigger is fired, including storing the one or more signal packages at the signal data store.

9. The method of claim 8, wherein the flush trigger is fired when a flush signal request is received from a signal generator that generates an overflow signal request as the flush trigger.

10. The method of claim 8, wherein the flush trigger is fired when a number of signal requests stored within the intermediate cache reaches a storage threshold.

11. The method of claim 8, wherein the flush trigger is fired when an oldest signal request stored within the intermediate cache has been stored for a configurable period of time.

12. The method of claim 8, wherein flushing the intermediate cache includes deleting the one or more signal packages from the intermediate cache after storing the one or more signal packages at the signal data store.

13. A system for processing signal requests that represent user interactions with applications, the system comprising:
a plurality of shards configured to store received signal requests, each of the received signal requests having a plurality of fields, the plurality of fields having metadata about the user interactions with applications;
a signal processor configured to process the received signal requests, identify a shard of the plurality of shards, and store the received signal requests in the identified shard;
an intermediate cache configured to temporarily store at least some of the received signal requests when an ingestion rate of the received signal requests meets a signal request rate threshold of the identified shard; and
wherein the signal processor is configured to aggregate a plurality of individual signal requests stored within the intermediate cache into a signal package according to content within the plurality of fields before storing the signal package in the identified shard using a single write request.

14. The system of claim 13, wherein the signal processor is configured to aggregate individual signal requests that correspond to a same user identifier for a user field of the plurality of fields into the signal package, and the signal package corresponds to the same user identifier.

15. The system of claim 14, further comprising a cache monitor configured to monitor a flush trigger associated with the intermediate cache and to cause the intermediate cache to flush the signal package to the identified shard in response to the flush trigger.

16. The system of claim 15, wherein the flush trigger is fired when a flush signal request is received from a signal generator that generates an overflow signal request as the flush trigger.

17. A system for processing signal requests that represent user interactions with applications, the system comprising:
a signal processor configured to process received signal requests, each of the received signal requests having a plurality of fields, the plurality of fields having metadata about the user interactions with applications;
wherein the signal processor is configured to:
receive signal requests from a plurality of computing devices;
route the received signal requests to be stored at a signal data store;
monitor an ingestion rate of the received signal requests by the signal processor;
when the ingestion rate meets a signal request rate threshold of the signal data store, automatically route overflow signal requests of the received signal requests to be stored at an intermediate cache instead of the signal data store;
aggregate the overflow signal requests within the intermediate cache into one or more signal packages according to content within the plurality of fields, each of the one or more signal packages containing a plurality of overflow signal requests, wherein a first signal package of the one or more signal packages comprises a first plurality of overflow signal requests; and
store the one or more signal packages at the signal data store, including storing the first plurality of overflow signal requests of the first signal package using a single write request.

18. The system of claim 17, wherein the signal processor is configured to store the one or more signal packages to respective shards of the signal data store, the signal data store comprising a plurality of shards.

19. The system of claim 17, wherein the signal processor is configured to flush the intermediate cache when a flush trigger is fired.

20. The system of claim 19, wherein the flush trigger is fired when a flush signal request is received from a signal generator that generates an overflow signal request as the flush trigger.

* * * * *